United States Patent
Diener et al.

(10) Patent No.: US 9,206,528 B2
(45) Date of Patent: Dec. 8, 2015

(54) METHOD AND DEVICE FOR THE PRODUCTION OF MOLDED BODIES

(75) Inventors: Andreas Diener, Grossschirma (DE); Oliver Tretzack, Hasel (DE); Helmut Schildknecht, Charlotte, NC (US); Daniel Witte, Grenzach-Wyhlen (DE)

(73) Assignee: LIST HOLDING AG, Arisdorf (CH)

( * ) Notice: Subject to any disclaimer, the term of this patent is extended or adjusted under 35 U.S.C. 154(b) by 791 days.

(21) Appl. No.: 12/866,667

(22) PCT Filed: Feb. 6, 2009

(86) PCT No.: PCT/EP2009/000837
§ 371 (c)(1),
(2), (4) Date: Sep. 10, 2010

(87) PCT Pub. No.: WO2009/098073
PCT Pub. Date: Aug. 13, 2009

(65) Prior Publication Data
US 2011/0024931 A1    Feb. 3, 2011

(30) Foreign Application Priority Data

Feb. 8, 2008  (DE) .......................... 10 2008 008 342
May 9, 2008   (DE) .......................... 10 2008 023 064

(51) Int. Cl.
| | |
|---|---|
| B29C 47/00 | (2006.01) |
| B29C 47/92 | (2006.01) |
| D01D 1/06 | (2006.01) |
| D01D 5/06 | (2006.01) |
| D01F 2/00 | (2006.01) |
| C08L 1/02 | (2006.01) |
| C08L 3/02 | (2006.01) |
| C08L 89/00 | (2006.01) |
| D01D 5/10 | (2006.01) |

(52) U.S. Cl.
CPC ................ *D01D 1/065* (2013.01); *B29C 47/92* (2013.01); *C08L 1/02* (2013.01); *C08L 3/02* (2013.01); *C08L 89/00* (2013.01); *D01D 5/06* (2013.01); *D01F 2/00* (2013.01); *B29C 47/0083* (2013.01); *B29C 2947/924* (2013.01); *B29C 2947/92019* (2013.01); *B29C 2947/92209* (2013.01); *B29C 2947/92514* (2013.01); *B29C 2947/92704* (2013.01); *B29C 2947/92895* (2013.01); *D01D 5/10* (2013.01)

(58) Field of Classification Search
None
See application file for complete search history.

(56) References Cited

U.S. PATENT DOCUMENTS

| | | | | |
|---|---|---|---|---|
| 2,838,792 | A | * | 6/1958 | Keight et al. .............. 264/37.26 |
| 3,033,697 | A | * | 5/1962 | Eskridge .................. 106/166.43 |
| 3,447,939 | A | | 6/1969 | Johnson |
| 3,833,021 | A | * | 9/1974 | Rose et al. ................. 138/118.1 |
| 4,145,532 | A | * | 3/1979 | Franks et al. .................. 536/56 |
| 4,324,593 | A | | 4/1982 | Varga |

(Continued)

FOREIGN PATENT DOCUMENTS

| | | |
|---|---|---|
| DE | 1713486 | 12/1955 |
| DE | 4118884 | 12/1992 |

(Continued)

*Primary Examiner* — Jeffrey Wollschlager
(74) *Attorney, Agent, or Firm* — Bachman & LaPointe, P.C.

(57) ABSTRACT

A method for the production of molded bodies from a base substance, wherein the base substance is mixed with a solution for producing a molding solution, and the solution subsequently is at least partially removed from the mixture, and the molding solution is fed to a unit for molding, wherein the molding solution is diluted before molding.

8 Claims, 1 Drawing Sheet

(56) References Cited

U.S. PATENT DOCUMENTS

| | | | |
|---|---|---|---|
| 4,416,698 A * | 11/1983 | McCorsley, III | 106/200.2 |
| 5,094,690 A * | 3/1992 | Zikeli et al. | 106/200.2 |
| 5,354,524 A * | 10/1994 | Sellars et al. | 264/37.2 |
| 5,534,113 A * | 7/1996 | Quigley et al. | 159/49 |
| 5,582,637 A * | 12/1996 | Uneback et al. | 106/166.41 |
| 5,688,455 A * | 11/1997 | Kehl et al. | 264/169 |
| 5,865,858 A * | 2/1999 | Schrell et al. | 8/561 |
| 6,488,876 B1 * | 12/2002 | Ruf | 264/186 |
| 6,610,134 B1 | 8/2003 | Kind et al. | |
| 6,875,756 B1 | 4/2005 | Michels et al. | |
| 7,115,187 B1 * | 10/2006 | Bauer et al. | 162/102 |
| 2003/0155673 A1 * | 8/2003 | Zikeli et al. | 264/40.6 |
| 2005/0230860 A1 * | 10/2005 | Bhushan et al. | 264/37.2 |

FOREIGN PATENT DOCUMENTS

| | | |
|---|---|---|
| DE | 4441468 | 5/1996 |
| DE | 19837210 | 11/1999 |
| DE | 19940521 | 4/2001 |
| WO | WO0026447 | * 11/2000 |
| WO | 0158960 | 8/2001 |
| WO | 0220885 | 3/2002 |

* cited by examiner

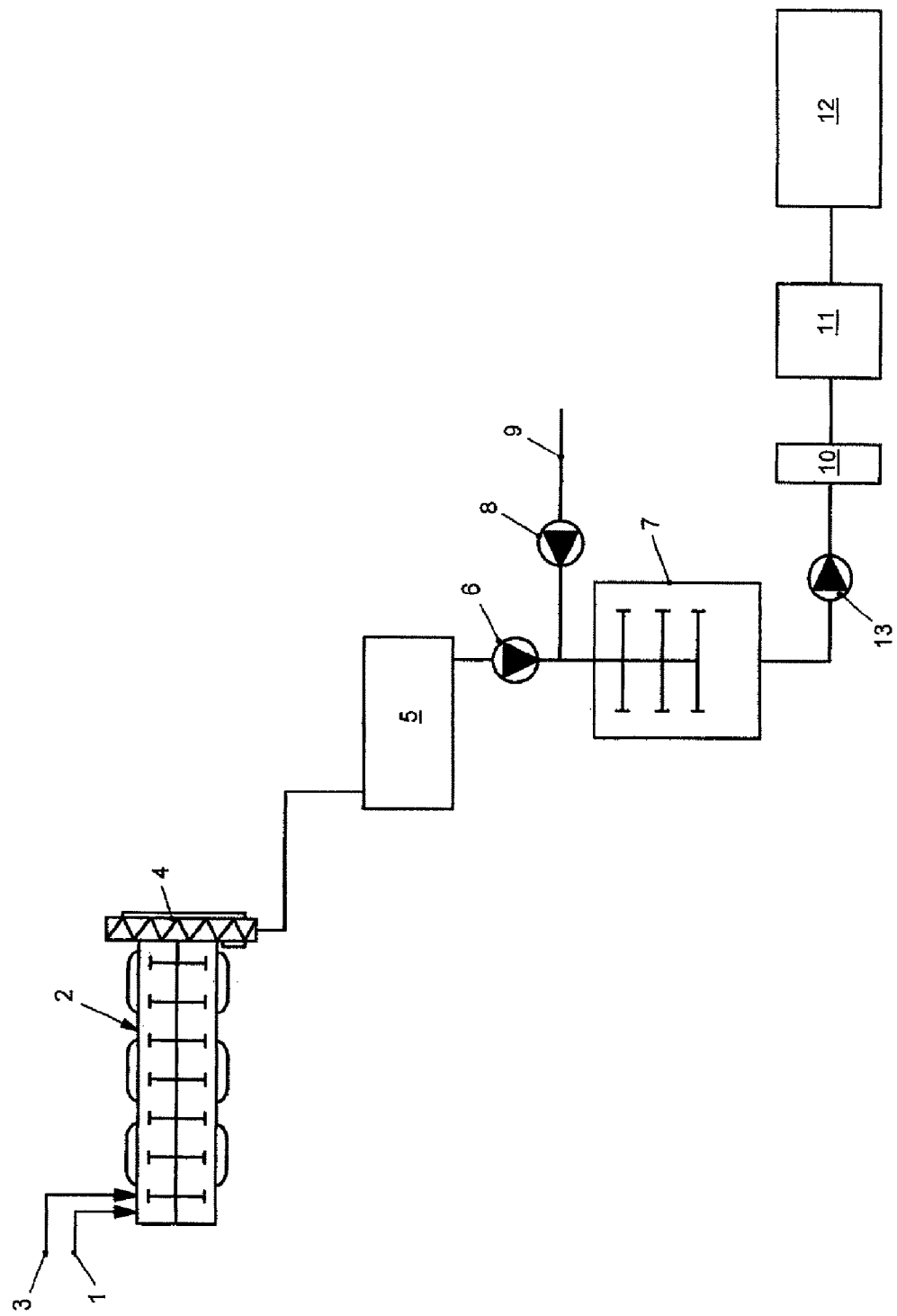

METHOD AND DEVICE FOR THE PRODUCTION OF MOLDED BODIES

BACKGROUND OF THE INVENTION

The present invention relates to a method for producing molded bodies from a base substance wherein the base substance for producing a molding solution is mixed with a solvent and subsequently this solvent is at least partly removed from the mixture and the molding solution is fed to a means for molding, and also to a device therefor.

In the present case, the term "molded bodies" subsumes all possible bodies obtainable from a natural or artificial base substance. This is generally accomplished with the aid of a molding tool whereby the base substance is brought into a mold for the molded bodies. An example which may be mentioned, purely for illustration and in no way exhaustive, is viscose fiber.

Viscose fibers are fibers consisting of cellulose as base material and industrially produced via the viscose process. The chemical nature of viscose fibers resembles that of cotton fibers.

Modal fibers are a similar product to viscose fibers. They likewise consist 100% of cellulose and, just like viscose fibers, are produced from natural pulp. However, a somewhat different process results in higher fiber strength and improved fiber properties being achieved.

The class of cellulosic fibers further includes Tencel and lyocell fibers. In the case of lyocell fibers, the nontoxic solvent NMMO (N-methylmorpholine N-oxide) is used to dissolve the pulp directly, without prior reaction with caustic soda and derivatization to the xanthate. Lyocell fibers are spun in a dilute aqueous NMMO bath by going below the solubility limit of the cellulose and thereby forming a thread. For this purpose, the corresponding spinning solution is pressed through spinneret dies. This lyocell process is described for example in DE 1 713 486, U.S. Pat. No. 3,447,939 or GB 8 216 566. The suitable spinning solution is produced for example in a horizontal kneading reactor as shown in DE 198 37 210 or WO02/20885 A1.

In these devices and according to the known methods, the spinning solution is produced in the further processable viscosity necessary for the spinning process and the associated cellulose concentration. However, the corresponding means for spinning can only process a spinning solution having low viscosity, but this significantly reduces the effectivity of the process for producing the spinning solution. Specific applications require very low viscosities and hence low cellulose contents, and this spinning solution can no longer be effectively produced using the known technology.

It is an object of the present invention to significantly improve the effectivity of the molding solution production and the production of the molded bodies.

SUMMARY OF THE INVENTION

The foregoing object is achieved when the molding solution is diluted prior to the molding operation.

The principle of the idea is to separate the production of the molding solution=eg, spinning solution and the molding/spinning and to operate each at the optimal viscosity or cellulose concentration. Since the known kneading reactors are in principle distinctly more efficient at high viscosities, this stage is operated at higher cellulose concentration and it is only after production of the spinning solution that the diluting is effected, with the corresponding concentrated amine oxide monohydrate, to the level of the viscosity, or cellulose concentration, needed for the spinning plant.

In terms of plant engineering, the separation of production of the molding solution from the molding step is characterized particularly in that between the actual kneading reactor and the means for molding there is interposed a mixer in which the high-viscosity molding solution is diluted. The separation of these two processing stages is further sharpened through appropriate interposed buffering containers.

Which molded body is produced is of minor importance. Preference is given to producing filaments, fibrous nonwoven webs or filament yarn. However, it is also possible to produce films, hollow fibers, membranes or the like. The molding of the solution into a desired cellulosic molded body can be effected using known spinneret dies for producing fibers, slot dies or hollow-fiber spinneret dies. After molding, ie, prior to being introduced into the coagulation bath, the molded solution can also be stretched.

The solvent used is preferably a tertiary amine oxide, more particularly an amine oxide monohydrate. However, the invention shall not be restricted thereto. Nor is the invention restricted to cellulose, but also comprises materials such as proteins, polylactides or starch or a mixture thereof.

The material to be dissolved shall have a significant water content of 1% to 80% at the start of the process. The material to be dissolved is then dissolved with the solvent. The water content is reduced in the process to the concentration of the solubility window.

At the end of the first stage of the process, the spinning solution, for example, shall have a 12% to 28% concentration in amine oxide monohydrate of the material to be dissolved. This spinning solution, then, is however not necessarily intermediately stored in a buffering container. If it is then provided for spinning, it is diluted, preferably again with amine oxide monohydrate, to a solution which is readily spinnable in the spinning plants. To this end, in accordance with a proposal of the present invention, the spinning solution is conveyed under overpressure by means of a volumetric pump, while amine oxide monohydrate is metered into the stream by means of a second volumetric pump. The two pumps are mutually adjusted such that the spinning solution produced has a desired low concentration of 4% to 14% in amine oxide monohydrate of the dissolved material. The dilute spinning solution is treated in a mixer of any desired design. This mixer optionally additionally serves as buffer.

Optionally, the homogenized molding solution downstream of the mixer is pressed, with or without pressure-enhancing pump, through a molding solution filter and is homogenized once more in the process. The filter has a mesh size of 1 to 500 μm.

To police the spinning solution, the refractive index and the temperature of the spinning solution and also of the amine oxide monohydrate is policed upstream of the mixer and downstream of the mixer. The refractive index should be between 1.48 and 1.49.

To prevent any change in the consistency of the spinning solution, all pipelines, pumps, mixers, ie, ideally all plant components with which the spinning solution comes into contact in whatever state and also the lines of the amine oxide monohydrate should be heated. The temperature chosen is a range from 80° C. to 120° C.

Furthermore, all plant components that contain spinning solution, amine oxide monohydrate and/or dilute spinning solution shall be monitored by pressure and temperature sensors and secured against any unallowable overpressure. This can be accomplished by means of bursting disks for example.

In the case of intermediate storage in buffering containers, care must be taken to ensure that these too are heated and that the spinning solution is introduced and discharged bubblelessly. Discharging is preferably accomplished under an admission pressure produced for example by pressurization with nitrogen on the product surface. This nitrogen should additionally be slightly humidified.

BRIEF DESCRIPTION OF THE DRAWINGS

Further advantages, features and details of the invention will be apparent from the following description of preferred illustrative embodiments and also from reference to the drawing which shows, in a single FIGURE, a schematic block diagram for the inventive method for producing molded bodies from renewable raw materials.

DETAILED DESCRIPTION

The cellulose needed for this is fed via supply line 1 to a kneading reactor 2. Such kneading reactors are known for example from DE 199 40 521 A1 or DE 41 18 884. However, the invention is not restricted to these kneading reactors. The invention comprises all treating means in which renewable raw materials can be subjected to a treatment for later spinning.

In the present illustrative embodiment, the renewable raw material is treated by means of a solvent, preferably amine oxide monohydrate, which is fed to the kneading reactor via a further supply line 3.

In the kneading reactor 2, heat is added to effect intensive commixing of the raw material with the solvent and also evaporation of the solvent to form a relatively high-viscosity spinning solution. This spinning solution is then fed, via a discharge means 4, to a buffering container 5. There it is intermediately stored with or without heating. As soon as spinning solution is needed, the relatively high-viscosity spinning solution is removed from the buffering container 5 by a volumetric pump 6, and the pump 6 conveys the spinning solution into a mixer 7. On the way there or directly into the mixer, the stream has added to it, likewise via a volumetric pump 8, a solvent, preferably amine oxide monohydrate. This is accomplished via the supply line 9.

In the mixer 7, then, the added amine oxide monohydrate effects a dilution of the spinning solution, for which the nature of the mixing and of the mixer itself are of minor importance.

A dilute spinning solution is then discharged from the mixer 7 and pressed by means of a pump 13 through a spinning solution filter 10. This effects a further homogenization of the spinning solution. Thereafter, the spinning solution can be intermediately stored in a further buffering container 11, if necessary. The actual spinning then takes place in a means 12.

The invention claimed is:

1. A method for producing fibers from a renewable base substance comprising the steps of:
    (a) a first dilution step comprising mixing a renewable base substance and a solvent in the presence of heat to intensify comixing and evaporate a portion of the solvent to produce a first spinning solution;
    (b) a viscosity lowering step consisting of diluting the first spinning solution from step (a) with the same solvent from step (a) to form a second diluted spinning solution having a viscosity below that of the first spinning solution and suitable for spinning;
    (c) spinning the second diluted spinning solution with the lower viscosity to produce fibers of the renewable base substance; and
    wherein a tertiary amine oxide is used as the solvent in step (a) and step (b).

2. A method according to claim 1, wherein the solvent comprises amine oxide monohydrate.

3. A method according to claim 2, wherein the first spinning solution is conveyed from a buffer vessel under pressure by means of a first volumetric pump, and the amine oxide monohydrate is metered into the first spinning solution with a second volumetric pump.

4. A method according to claim 3, wherein the two volumetric conveying pumps are matched to one another such that a spinning solution with a concentration of 4 to 14% of base substance to be dissolved in amine oxide monohydrate is produced.

5. A method according to claim 1, wherein the second diluted spinning solution is treated in a mixer.

6. A method according to claim 1, wherein steps (b) and (c) are carried out at a temperature of 80 to 120° C.

7. A method according to claim 1, wherein the second diluted spinning solution is stored in a buffer vessel prior to spinning.

8. A method according to claim 7, wherein the second diluted spinning solution is introduced into the buffer vessel in a bubble-free state.

* * * * *